No. 719,818. PATENTED FEB. 3, 1903.
J. S. LAYTON.
VEHICLE WHEEL.
APPLICATION FILED SEPT. 25, 1902.
NO MODEL.
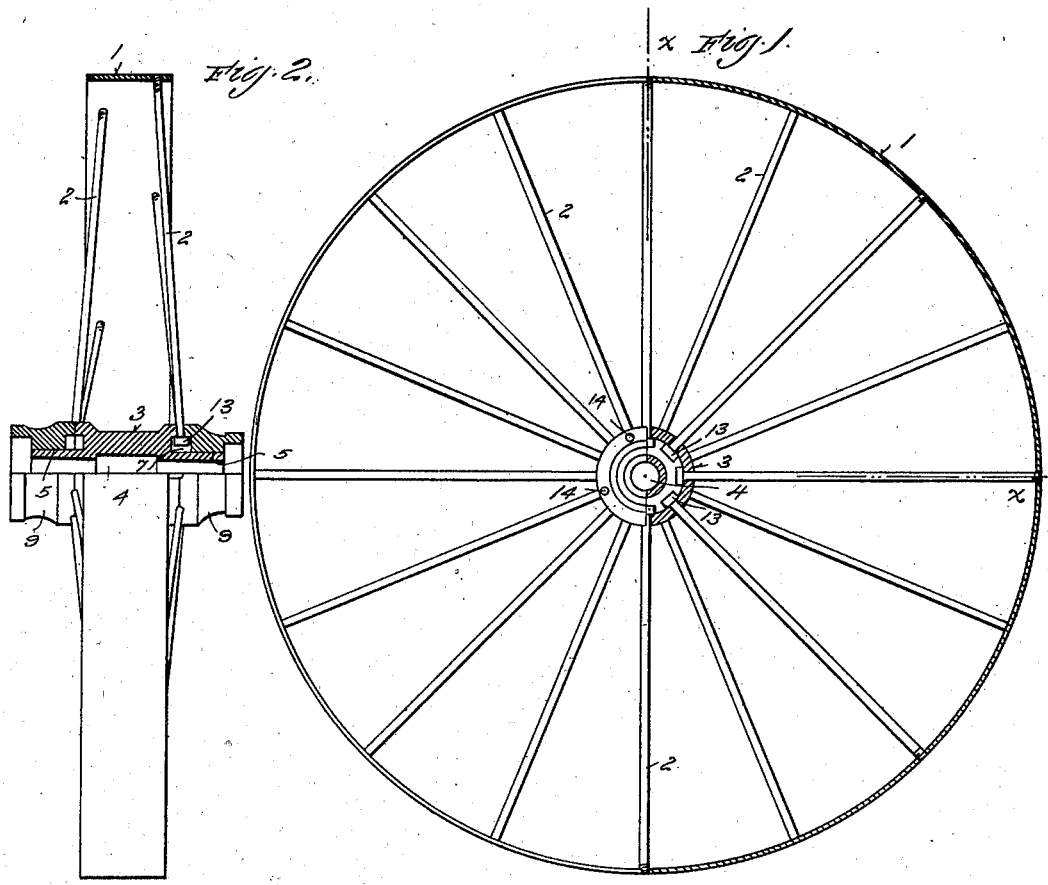
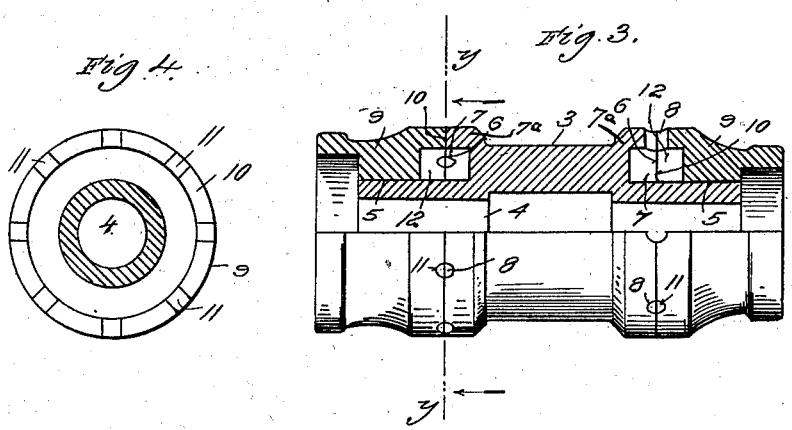
WITNESSES:
INVENTOR,
John S. Layton,
BY
ATTORNEY.

UNITED STATES PATENT OFFICE.

JOHN S. LAYTON, OF SPRINGFIELD, OHIO.

VEHICLE-WHEEL.

SPECIFICATION forming part of Letters Patent No. 719,818, dated February 3, 1903.

Application filed September 25, 1902. Serial No. 124,722. (No model.)

*To all whom it may concern:*

Be it known that I, JOHN S. LAYTON, a citizen of the United States, residing at Springfield, in the county of Clark and State of Ohio, have invented certain new and useful Improvements in Vehicle-Wheels, of which the following is a specification, reference being had therein to the accompanying drawings.

This invention relates to vehicle-wheels, and more particularly to metallic wheels of the suspension type, and has for its object to provide a wheel of this class which shall be simple and strong in construction, readily trued and tensioned, and which may be readily assembled or taken apart when necessary.

To this end my invention consists in certain novel features, which I will now proceed to describe and will then particularly point out in the claims.

In the accompanying drawings, Figure 1 is an elevation, half in vertical section, of a wheel embodying my invention. Fig. 2 is a view, partly in elevation and partly in section, along the line $x$ $x$ of Fig. 1. Fig. 3 is an enlarged view of the hub portion of the wheel, half in longitudinal central section; and Fig. 4 is a sectional view taken along the line $y$ $y$ of Fig. 3 and looking in the direction of the arrows.

In carrying out my invention I employ an annular metallic rim 1, into which the outer ends of the spokes 2 are threaded, the spokes being connected to the rim alternately on opposite sides of the central plane thereof.

3 indicates the hub proper as a whole, constructed, as are the spokes and rim, of metal and constituting a combined hub and axle-box in a single piece, the hub being provided to this end with a central bore 4 to receive the spindle of the axle. The body portion 3 of the hub is reduced at each end, as indicated at 5, thus forming near each end of the hub a radial face or shoulder 6, located some distance back of the end of the hub and provided with an annular groove or recess 7, the bottom of which is continuous with the surface of the adjacent reduced portion 5. The overhanging annular portions 7ª thus formed are each provided with radial notches or semicircular recesses 8 to receive the spokes.

Upon the reduced ends 5 of the hub proper are fitted sleeves 9, having at their inner ends radial faces 10, which abut against the radial faces 6 of the shoulders of the hub and which are provided with notches or semi-circular recesses 11, corresponding to and opposite the similar notches or recesses 8 of the hub-shoulders. The inner radial face of each sleeve 9 is provided with an annular groove or recess 12, corresponding in size and location to the similar groove or recess 7 of the adjacent portion of the hub proper, the two recesses meeting to form an inclosed channel at each side of the hub to receive the enlarged heads 13 of the spokes 2. It will be observed that these channels are of considerably greater length radially than the thickness of the heads of the spokes, so that these latter when tightened up bear against the under sides of the overhanging portions of the hub proper and its sleeves and are not in contact with but lie considerably outward from the reduced extensions 5 of the hub. It will also be observed that the hub proper and the sleeves mounted on the ends thereof are formed at their abutting portions into radial flanges, by means of which the sleeves may be secured to the hub by rivets or bolts 14, passing through said flanges. The sleeves may, however, be otherwise secured to the hub proper.

The heads of the spokes are preferably non-circular or polygonal in cross-section in a plane at right angles to the axis of the spoke, and I prefer to make them square in cross-section. Where this construction is employed, the annular channel or recess formed by the grooves 7 and 12 is of a width less than the maximum diameter of the heads, so that when the parts are assembled the heads are prevented from turning in the annular recesses or channels, and the spokes are thus also prevented from turning, thereby maintaining the tension or adjustment of the wheel.

It will be seen that the parts of the wheel may be readily assembled by uniting the spokes to the rim and to the hub proper before the sleeves are placed in position on the ends of the hub and that the wheel may then be properly tensioned and trued up by turning the spokes, owing to the threaded connection between the outer ends of the spokes and the rim.

Of course it will be understood that the heads at the inner ends of the spokes are fixed, in the sense that they are not longitudinally movable relatively to the spokes—as, for instance, a nut would be—and these heads are preferably positively fixed or integral for the further reason that when they are non-circular in form, which is my preferred construction, they serve to prevent any turning of the spokes when the sleeves are in position on the ends of the hub. It is further to be noticed that those portions of the spokes lying immediately adjacent to and outward from the heads are circular in cross-section or otherwise so formed that they may rotate in the notches or recesses 8 in the overhanging annular portions 7$^a$ at the ends of the body of the hub. By reason of this construction the tensioning and truing operation may be performed while the inner ends of the spokes are in engagement with the hub. This tensioning and truing operation is performed before the sleeves are placed in position on the ends of the hubs, so that at this time the spokes are free to rotate when, as in my preferred construction, the heads are non-circular and fixed. This possibility of rotation arises from the fact that the outer walls of the annular recesses or channels being formed by the sleeves are absent and the inner ends of the spokes are free to move slightly outward (maintaining their engagement with the hub, however) to permit this rotation. After the wheel is properly tensioned and trued the sleeves are slipped into position on the ends of the hub and secured thereon, and when the heads of the spokes are non-circular and fixed, as is preferred, and the parts are thus assembled, the annular recess being of less width than the maximum diameter of the spoke-heads, the spokes are then prevented from turning. It will thus be seen that the spokes are free to turn, maintaining their engagement with the hub during the assembling and truing up of the wheel, but in the preferred form of my invention are not free to turn after the sleeves are secured in position. It will also be seen that since the annular recesses in the hub are of greater depth than the spoke-heads the inner ends of the spoke-heads will not come into contact with the hub when the wheel is under a load, so that the entire weight of the load will be taken by those spokes which extend upward from the hub to the rim and no portion of the load will be transmitted to the spokes which extend downward from the hub to the rim. Thus in practical operation none of the spokes is under compression and the wheel is a true suspension-wheel. The wheel may be readily adjusted or trued at any time that such adjustment becomes necessary, and in case of breakage of any of the parts the same may be readily removed and replaced. It will also be observed that the construction is extremely simple and at the same time of great strength.

I do not wish to be understood as limiting myself to the precise details of construction hereinbefore described, and shown in the accompanying drawings, as the same may obviously be modified without departing from the principle of my invention.

Having thus fully described my invention, what I claim as new, and desire to secure by Letters Patent, is—

1. A metallic vehicle-wheel comprising a rim, spokes having a threaded connection at their outer ends with the rim and provided with heads or enlargements at their inner ends, relatively fixed, as described, and a hub comprising a body portion or hub proper having reduced ends, and sleeves fitting on said reduced ends, the abutting faces of the sleeves and of the central portion of the hub proper being provided with opposite annular grooves forming annular recesses of greater depth than the thickness of the spoke-heads, and with outwardly-extending opposite notches or recesses forming passages for the spoke-bodies, of less diameter than the heads, the spoke-bodies being rotatable in the outwardly-extending notches or recesses of the hub proper and means for securing the sleeves in position on the hub proper, substantially as described.

2. A metallic vehicle-wheel comprising a rim, spokes having a threaded connection at their outer ends with the rim and provided with heads or enlargements at their inner ends, relatively fixed, as described, and a hub comprising a body portion or hub proper having reduced ends, and sleeves fitting on said reduced ends, the abutting faces of the sleeves and of the central portion of the hub proper being provided with opposite annular grooves forming annular recesses of greater depth than the thickness of the spoke-heads, and with outwardly-extending opposite notches or recesses forming passages for the spoke-bodies, of less diameter than the heads, the spoke-bodies being rotatable in the outwardly-extending notches or recesses of the hub proper, the inner ends of said sleeves and the outer ends of the central portion of the hub proper being provided with outwardly-extending flanges, and fastening devices passing through said flanges to secure the sleeves in position on the hub proper, substantially as described.

3. A metallic vehicle-wheel comprising a rim, spokes having a threaded connection at their outer ends with the rim and provided at their inner ends with fixed non-rotatable heads or enlargements non-circular in cross-section, and a hub comprising a body portion or hub proper having reduced ends, and sleeves fitting on said reduced ends, the abutting faces of the sleeves and of the central portion of the hub proper being provided with opposite annular grooves forming annular recesses of greater depth than the thickness of the spoke-heads, and of less width than their maximum diameters, and with outwardly-extending opposite notches or recesses forming passages for the spoke-bodies, said passages being of less diameter than the heads, and the spoke-bodies being rotatable in the outwardly-extending notches or recesses of the hub proper when the sleeves are not in place, and means for securing the sleeves in position on the hub proper, substantially as described.

In testimony whereof I affix my signature in presence of two witnesses.

JOHN S. LAYTON.

Witnesses:
F. M. HAGAN,
IRVINE MILLER.